United States Patent [19]
Hung

[11] Patent Number: 5,516,074
[45] Date of Patent: May 14, 1996

[54] TWIN-TYPE BUFFERING PAD

[76] Inventor: Michael Hung, 9-16, Nan Kan Hsia, Nan Kan, Lu Chu Hsiang, Tao Yuan County, Taiwan

[21] Appl. No.: 374,303

[22] Filed: Jan. 18, 1995

[51] Int. Cl.[6] ........................................... F16F 7/12
[52] U.S. Cl. ..................... 248/634; 428/909; 428/99; 267/140.11; 267/140.5; 267/141
[58] Field of Search ............... 428/99, 909; 248/634; 267/140.11, 140.5, 141

*Primary Examiner*—Alexander S. Thomas
*Attorney, Agent, or Firm*—Wenderoth, Lind & Ponack

[57] ABSTRACT

A twin-type buffering or dampening pad is made from very tough rubber material. The pad is highly deformable and flexible and particularly suitable for installation between the foot board and the side frame of a running machine to absorb or dampen shock. The pad includes a pair of symmetrical cylinders integrally connected by a reinforced rib and arranged inverted relative to each other. Each of the cylinders has a flat surface at one end, which has a screw hole at the center and a convex or semi-spherical surface at the opposite end. The semi-spherical surface on one of the cylinders is flush at its apex with the adjacent flat surface on the other cylinder to simultaneously contact a face to efficiently absorb the shock produced from all directions by random stepping force when a user runs on the running machine.

5 Claims, 3 Drawing Sheets

TWIN-TYPE BUFFERING PAD

BACKGROUND OF THE INVENTION

The present invention relates to a buffering or dampening pad, and more particularly to a twin-type buffering pad which can be installed and secured between two boards to absorb the shock produced from all directions by these two boards.

In conventional running machines, springs or soft pads are often placed between the foot boards and side frames for reducing the shock produced when a user runs on the running machine. FIGS. 4 and 5 illustrate a known running machine, in which a foot board 10 is drilled with a hole 101. A side frame 20 is also drilled with a thru-hole 201 at the top, and a threaded tube 30 is welded to the underside of the side frame 20 in alignment with thru-hole 201. During assembly, the foot board 10 is inserted into the side frame 20, and a bolt 40 passes through a spring disk 50 and the hole 101 to be received into the threaded tube 30 for securing the foot board 10 onto the side frame 20. The shock produced by the stepping force when a user steps on the foot board 10 (there is a cover sheet above it) is reduced by the expansion and compression of the spring disk 50. However, the stepping force applied by a user is not even. The resulting random stepping force usually makes the foot board subject to shock which is likely to shift the running machine.

SUMMARY OF THE INVENTION

It is the object of the present invention to provide a twin-type buffering or dampening pad which is particularly suitable for use as a shock absorption device in a running machine. According to the present invention, the twin-type buffering pad is comprised of a pair of symmetrical cylinders integrally connected by a reinforced rib. The cylinders are inverted with respect to each other. Each of the cylinders has a flat surface at one end, which has a screw hole in the center for receiving a securing device. The opposite end of each cylinder has a semi-spherical or convex surface which is flush at its apex with the adjacent flat surface on the other cylinder for simultaneously contacting a face to efficiently absorb or dampen the shock produced from all directions by the random stepping force produced when a user runs on the running machine.

DETAILED DESCRIPTION OF THE PREFERRED EMBODIMENT

Figure 1:
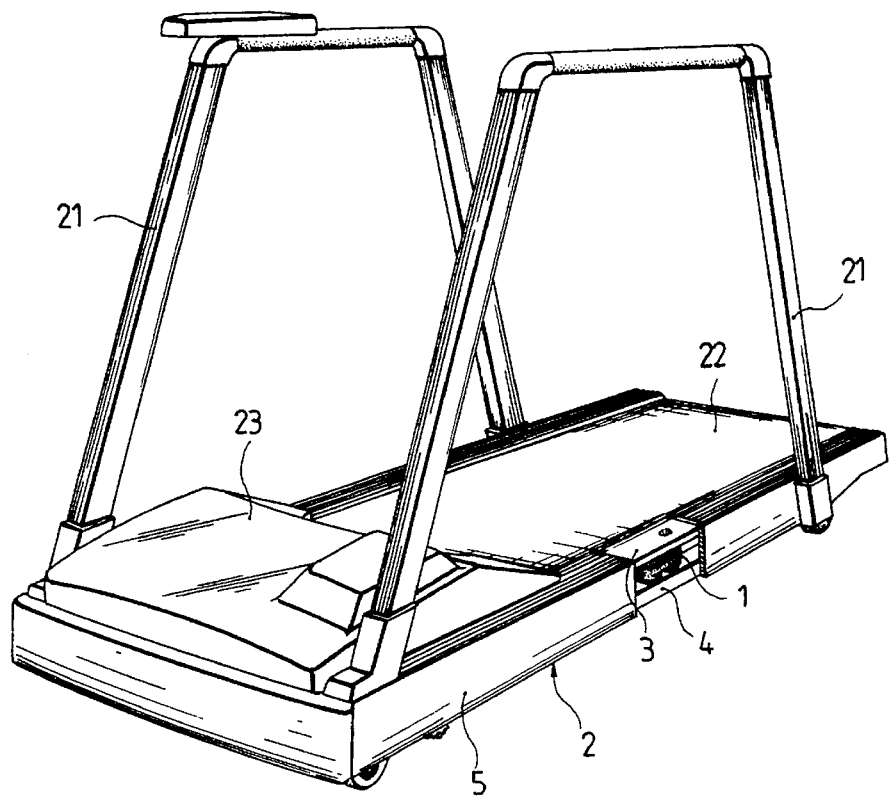
FIG. 1 is a perspective view showing a running machine with a twin-type buffering or dampening pad according to the present invention.
Figure 2:
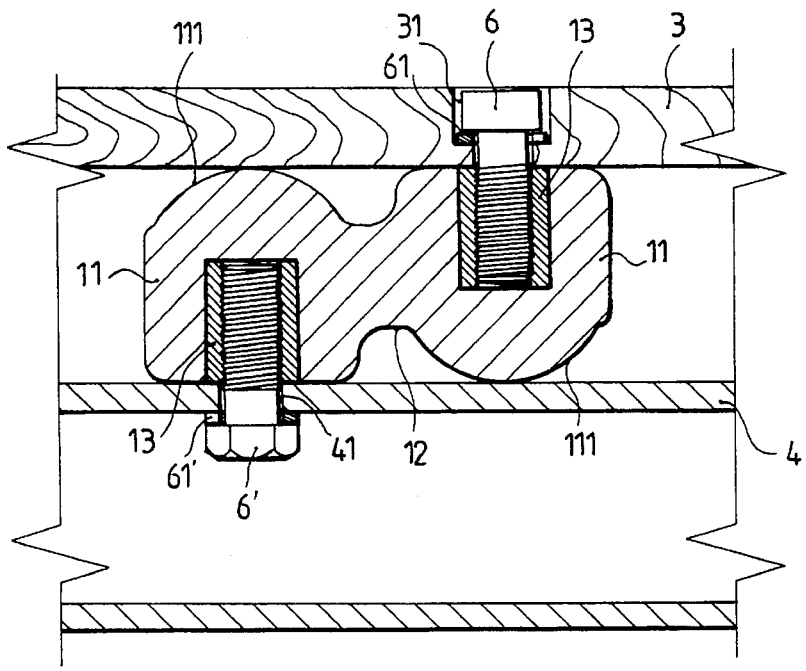
FIG. 2 is a sectional view showing how the twin-type buffering pad of the present invention is installed and secured between a foot board and a side frame of the running machine.
Figure 3:
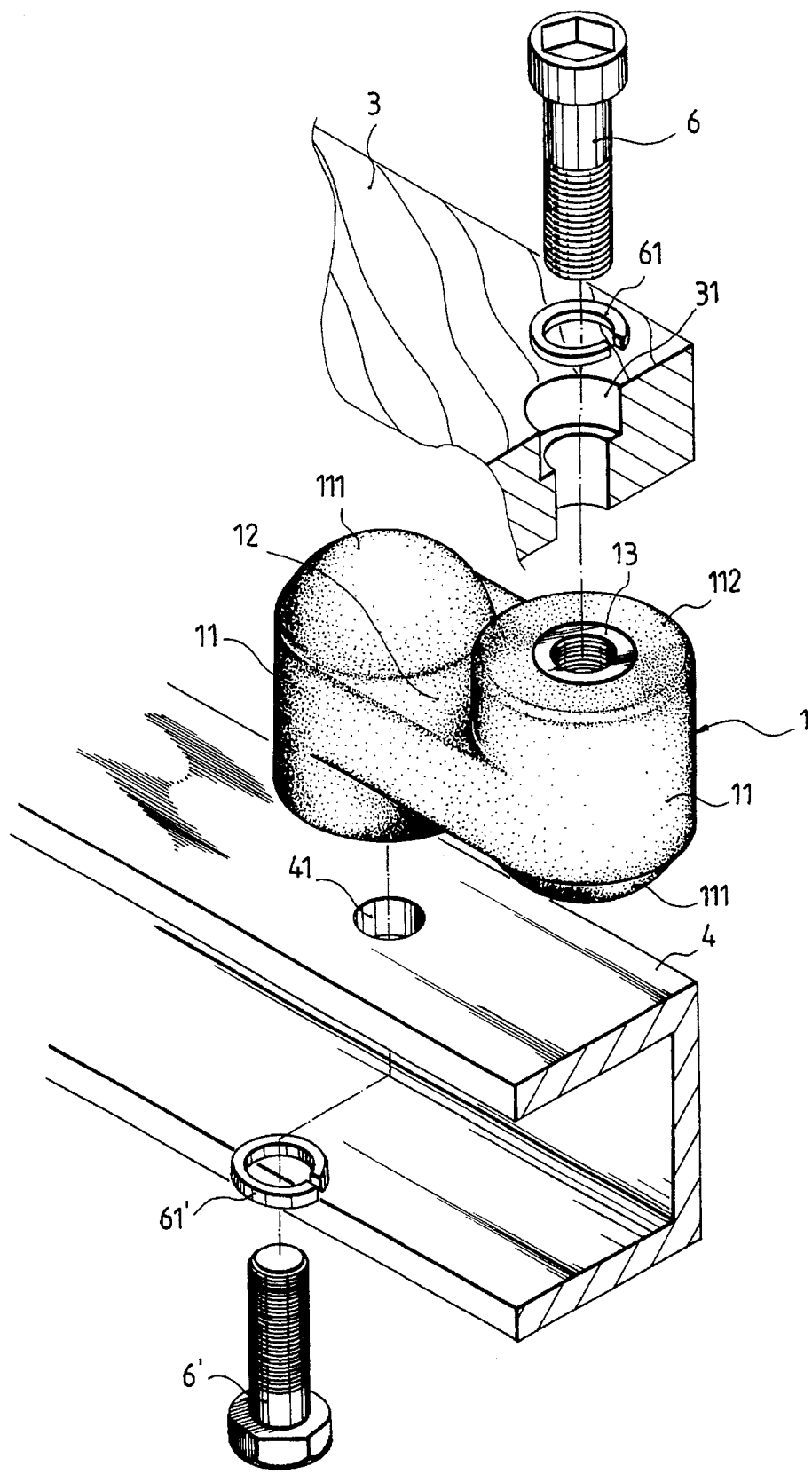
FIG. 3 is an exploded view of FIG. 2.
Figure 4:
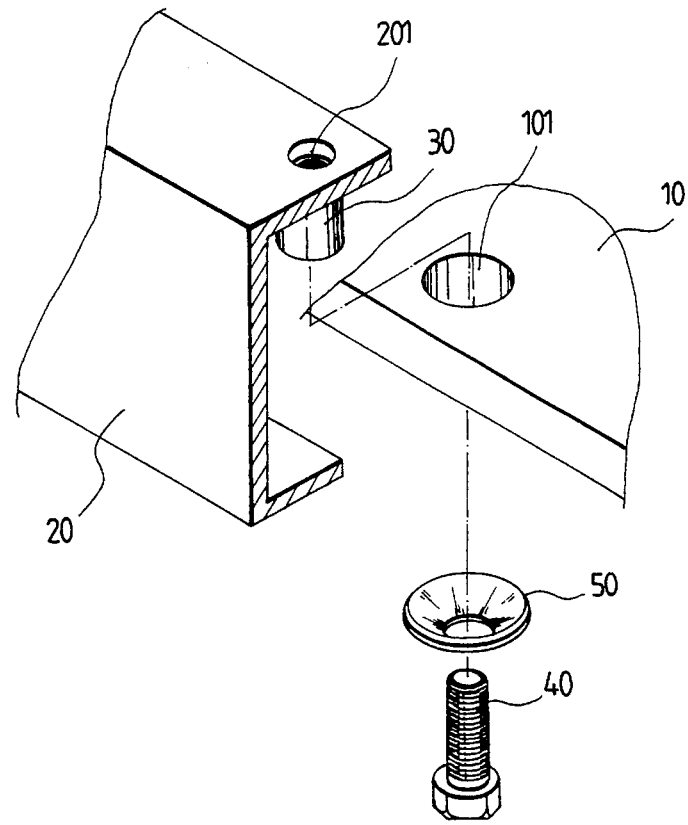
FIG. 4 is an exploded view showing how a conventional spring disk is installed and secured on a foot board and a side frame of a running machine.
Figure 5:
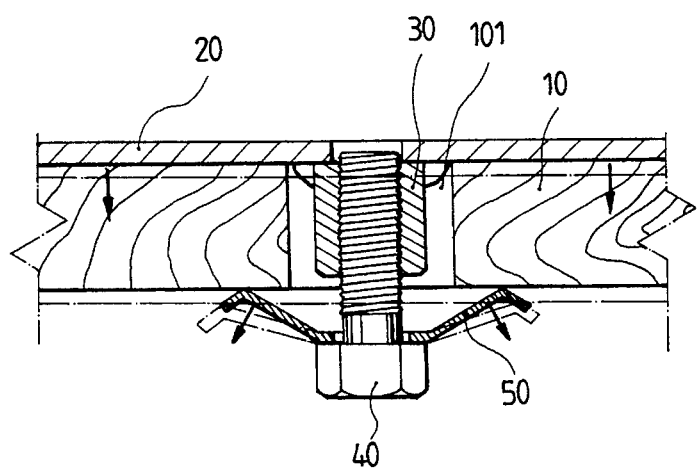
FIG. 5 is a sectional assembled view of FIG. 4.

Referring to FIGS. 1, 2 and 3, a twin-type buffering pad 1 in accordance with the present invention is particularly suitable for use on a running machine 2 of the type comprising a pair of hand grip supports 21, a cover sheet 22 rotated by driving rollers (not shown) in response to stepping action thereon, a foot board 3 disposed under the cover sheet 22 for bearing the stepping force exerted by the user, a side frame 4 for supporting the foot board 3, and an outer frame 5 for giving a better look after assembly of the running machine. The twin-type buffering pad 1 is installed and secured between the foot board 3 and the side frame 4 to efficiently absorb the shock produced by the random stepping force when a user runs on the running machine 2.

The twin-type buffering or dampening pad 1 embodying the present invention is generally comprised of a pair of cylinders 11 made from very tough rubber material. The rubber material is highly deformable and flexible. The pair of symmetrical cylinders 11 are arranged in an inverted relationship to each other and are integrally connected by a reinforced rib 12. Each cylinder has a semi-.spherical surface 111 at one end and a flat surface 112 at the opposite end. The apex of the semi-spherical surface 111 of the cylinder 11 lies in the same plane as the flat surface 112 of the adjacent inverted cylinder 11, or vice versa. With such an arrangement, a convex or semi-spherical surface 111 and an adjacent flat surface 112 located at the same level can simultaneously contact a face (i.e., a bottom face of the foot board 3 or the top face of the side frame 4 as shown in FIG. 2) to increase the frictional resistance and exert an anti-skid action due to the different shapes, thus being particularly suitable for absorbing the shock produced from all directions by random stepping force.

In the buffering pad 1 of the present invention, the flat surface 112 of each cylinder 11 is provided with a screw hole formed by threaded tube 13 at its center. Thru-holes 31, 41 may be made at selected places on the foot board 3 and the side frame 4, respectively, so that a socket screw 6 may pass through a washer 61 and the thru-hole 31 of the foot board 3 to fit into the threaded tube 13 of one flat surface 112. A hexagon screw 6' may pass through a washer 61' and the thru-hole 41 of the side frame 4 to fit into the other flat surface 112 for firmly securing the buffering pad 1 in place between the foot board 3 and the side frame 4. Further, the thru-hole 31 of the foot board 3 may be a countersunk hole, making the socket screw 6 flush with the foot board 3 after it is fitted into the thru-hole 31 for easier laying of the cover sheet 22 thereon. Then, the outer frame 5 is used for giving the running machine a better exterior appearance.

By making a plurality of thru-holes 31, 41 at equal intervals around the foot board 3 and the side frame 4 of the running machine 2, respectively, through which the screws 6, 6' pass for securing the buffering pads in place between the foot board 3 and the side frame 4, the random stepping force acting on the foot board 3 when a user runs on the cover sheet 22 is thus counter-acted by the buffering pads 1 to absorb the shock produced by the running machine 2. The resulting stability and elasticity makes the user feel very comfortable when stepping on the running machine 2.

What is claimed is:

1. A deformable pad for absorbing shock, said pad comprising:

a pair of cylinders having first and second ends;

each of said cylinders having a flat surface at said first end and a convex surface at said second end, said convex surface having an apex;

said flat surface having a screw hole for receiving a securing member; and said cylinders being connected together such that the apex of each convex surface being located in a plane which includes the flat surface of the adjacent cylinder for simultaneously contacting a surface to absorb shock.

2. The deformable pad as claimed in claim 1, wherein said cylinders are connected by an integrally formed rib.

3. The deformable pad as claimed in claim 1, wherein said pad is formed of a resilient rubber material.

4. The deformable pad as claimed in claim 3, wherein said screw hole is formed by a threaded tube embedded in each said cylinder.

5. The deformable pad as claimed in claim 1, wherein said screw hole is formed by a threaded tube embedded in each said cylinder.

* * * * *